United States Patent Office 3,151,937
Patented Oct. 6, 1964

3,151,937
MANUFACTURE OF DEFLUORINATED PHOSPHATES
John D. Nickerson, Lakeland, Fla., assignor to International Minerals & Chemical Corporation, a corporation of New York
No Drawing. Filed Oct. 25, 1960, Ser. No. 64,743
9 Claims. (Cl. 23—109)

The present invention generally relates to the manufacture of defluorinated phosphates. More particularly it relates to a process for defluorinating acid treated phosphate rock to produce a defluorinated phosphate useful as animal feed or animal feed supplement, although the defluorinated phosphate may also be used as a fertilizer or plant food.

Superphosphate is a term generally applied to the product obtained by treating finely ground phosphate rock with sulfuric acid. Phosphate rock is predominantly tricalcium phosphate and when it is treated with sulfuric acid the tricalcium phosphate is converted into a mixture of calcium sulfate and hydrated monocalcium orthophosphate.

Triple superphosphate is a concentrated phosphate manufactured in a process similar to that used for preparing ordinary superphosphate except that phosphoric acid is utilized in place of sulfuric acid. In the manufacture of triple superphosphate finely ground phosphate rock is mixed with phosphoric acid in predetermined proportions. The resultant mass is permitted to set up and is cured in large storage piles. The main phosphate ingredient in triple superphosphate is hydrated monocalcium orthophosphate.

The mineral phosphates of all of the commercially exploited natural deposits in the United States and in most foreign countries contain fluorine which may be present in an amount as high as 3.8% by weight or higher, and is generally about 3.3%. When these mineral phosphates are used to manufacture superphosphate and/or triple superphosphate the fluorine carries over into the phosphatic product. Because of the presence of significant proportions of fluorine in superphosphate and triple superphosphate, these phosphatic materials are not generally suitable for use as animal feeds since serious detrimental effects are caused by the continued feeding of significant amounts of fluorine to animals, particularly cattle. It is, therefore, generally necessary to reduce the fluorine content of phosphate rock and of phosphatic materials made from phosphate rock before the phosphatic material is suitable for use as an animal feed. In feed grade phosphates the weight ratio of phosphorus to fluorine, P/F, is preferably greater than 50, and still more preferably greater than about 100.

The availability of the phosphate is also an important factor to consider when the phosphate is used as an animal feed. By availability as used herein is meant that the phosphate is in the orthophosphate form or an equivalent state such as is found in beta-tricalcium phosphate, in which state the phosphate can best be assimilated by the animal. For animal feed, the phosphate is preferably substantially 100% in the ortho form, as determined by solubility in 0.4% HCl. Moreover, chick feeding tests have shown that preferably 80% or more of the phosphate should be soluble in neutral ammonium citrate.

Accordingly, it is an object of the present invention to provide a process for manufacturing a phosphate product of low fluorine content.

It is another object of the present invention to provide an animal feed ingredient meeting the industry's requirement for a product having a P/F weight ratio greater than 50.

A specific object of the present invention is to provide a process for manufacturing an animal feed ingredient from superphosphate.

Another specific object of the invention is to provide a process for manufacturing an animal feed ingredient from triple superphosphate.

These and other objects and advantages of the present invention will be apparent as the description of the present invention progresses.

In accordance with the present invention, superphosphate, triple superphosphate or mixtures of these phosphates, containing fluorine is subjected to a calcining treatment in a gaseous atmosphere containing less than 10 volume percent of water vapor at a temperature within the range of from about 600° F. to about 1200° F. and preferably of from about 800° F. to about 1100° F. Temperatures above about 600° F. effect the formation of an amorphous partially defluorinated calcined material. Temperatures above 1200° F. are to be avoided since at temperatures above 1200° F. the formation of crystalline metaphosphates occurs which decreases the citrate soluble and water soluble $P_2O_5$ content of the product. The calcination is preferably conducted in an air atmosphere. The water content in the gaseous heating atmosphere is preferably below 10 volume percent since it has been determined that the presence of steam during the calcination at temperatures above 600° F. tends to give greater amounts of crystalline phosphates which are not readily hydrolyzed under the hydrolyzing conditions employed and thus produce a hydrolyzed product of lower orthophosphate, citrate soluble $P_2O_5$, and water soluble $P_2O_5$ content. It has been determined that at temperatures within the hereinbefore set forth ranges an amorphous partially defluorinated material results with the residual fluorine being susceptible to removal by hydrolysis with steam. The hydrolysis by steam step is hereinafter further set forth. The time period of calcining is usually more than 5 minutes and less than 6 hours and preferably more than 15 minutes and less than 4 hours; however, shorter or longer periods of time may be used.

After the calcination the calcined material is subjected to a hydrolysis treatment by heating in the presence of steam at predetermined conditions. It has been determined that a defluorinated phosphate of high availability may be prepared when the calcined material is heated to a temperature within the range of from about 212° F. to about 446° F. in an atmosphere containing a large amount of water vapor.

The process in its preferred embodiment entails the intimate mixing of finely divided calcined phosphatic material and steam. Other material may, of course, be included in the solids mixture as, for example, lime, limestone, soda ash, etc. The fluorine-containing solid phosphatic material which is to be subjected to calcining and hydrolysis has a P/F weight ratio less than 50/1, generally less than 25/1 and more generally less than 10/1. This material is preferably utilized in a finely divided form, generally less than 1 mm. size. The fluorine-containing phosphatic material may be superphosphate, triple superphosphate, or mixtures thereof, and, of course, mixtures containing these phosphatic materials. These phosphatic materials generally contain at least 1% by weight of fluorine and the present invention is particularly directed to defluorinating such materials. The phosphatic material is best utilized when it is finely ground so that from about 40% to about 80% is capable of passing through a 100 mesh screen. Less finely divided material may, however, be used.

In accordance with the present invention, the calcined phosphatic material is subjected to hydrolysis by heating in the presence of steam to drive off fluorine and to produce a product having a high P/F ratio and a high citrate soluble P₂O₅ content. The calcination as well as the hydrolysis may be effected in any suitable equipment such as a rotary kiln in which the phosphatic material is subjected to a tumbling action and in which the solids and gas can pass cocurrently but prefereably pass in countercurrent flow. The phosphatic material may also be treated in equipment of the moving bed type. Fluid bed or fluidized bed systems may also be used.

In the hydrolysis step of this invention the phosphatic material is heated to a temperature above 212° F. and below 446° F. At temperatures below 212° F. effective hydrolysis is not achieved and at temperatures above 446° F. the availability of the phosphate in the product is substantially lower. A preferred temperature range is from about 300° F. to about 446° F. Effective defluorination and the production of a product of high availability have been achieved when operating at temperatures within these ranges.

The hydrolysis is conducted in an atmosphere of at least 50 volume percent steam, preferably at least 75 volume percent steam, and more preferably is conducted in an atmosphere of substantially pure steam. It has been determined that it is preferable to remove the evolved fluorine from contact with the phosphatic material during the hydrolysis operation and it is, accordingly, preferred that the steam be passed through the phosphatic material in the hydrolysis step of the present invention so as to sweep the evolved fluorine away from contact with the solid phosphatic material. Effective hydrolysis may be effected with less than about 100 pounds of steam per minute per ton of phosphatic material and more preferably less than 50 pounds of steam per minute per ton of phospatic material achieves the desired degree of hydrolysis and defluorination. In general, at least 0.5 pound of steam per minute per ton of phosphatic material is used. As hereinbefore set forth, defluorination of the calcined phosphatic material during the hydrolysis in the presence of steam is enhanced by the sweeping action of the steam passing over and through the calcined phosphatic solids.

During the hydrolysis, fluorine is driven off from the calcined phosphatic material and the orthophosphate content of the calcined material is increased so as to render it acceptable as an animal feed ingredient. In general, the temperature of the hydrolysis in the presence of steam and the period of time the phosphatic material is subjected to hydrolysis are dependent variables with longer times being required at lower temperatures to achieve the same P/F. Or, conversely, at higher temperatures shorter periods of time are required to achieve the same P/F. The time period the calcined phosphatic material is subjected to hydrolysis is usually more than 5 minutes and less than 6 hours and preferably more than 15 minutes and less than 4 hours; however, shorter or longer periods of time may be used. A period of time longer than necessary to achieve the desired P/F and orthophosphate content is, however, generally economically impractical.

After the hydrolysis with steam in accordance with the present invention it is preferable to cool the product in a steam atmosphere to a temperature below 300° F. before exposing the product to the atmosphere. Exposing the product to the air when at a temperature above 300° F. generally lowers the orthophosphate water soluble P₂O₅ and citrate soluble P₂O₅ content of the product.

The citrate solubility of the product prepared in accordance with this invention is high. The high P/F ratio and the high citrate solubility make the product eminently suitable for use as an animal feed ingredient; the product may, however, also be used as a plant food.

The process of the invention will be more fully understood from the following examples which are given by way of illustration only and without any intention of the invention being limited thereto.

EXAMPLE I

Three samples of a single triple superphosphate head sample were subjected to calcination treatments in a vertical one inch tube furnace. Sample A was calcined in an air atmosphere for one hour at 932° F. Samples B and C were calcined in a steam atmosphere at the temperatures shown in the table below. After the one hour calcination treatments the samples were subjected to hydrolysis by heating the samples at 356° F. for one hour in a 100% steam atmosphere. Each hydrolyzed sample was then analyzed for the orthophosphate content. The results of these tests are given below in Table 1.

Table 1

| Sample | Calcination Atmosphere | Calcining Temperature, ° F. | Percent of Total P₂O₅ as Ortho |
|---|---|---|---|
| A | Air | 932 | 69.1 |
| B | Steam | 914 | 33.3 |
| C | Steam | 752 | 27.5 |

The treatment of Sample A, which was in accordance with the teachings of the present invention, produced a product having a high orthophosphate content. Samples B and C, which were calcinized in a steam atmosphere, had much lower orthophosphate contents.

These tests, therefore, clearly illustrate that a substantial amount of steam should not be present during the calcination treatment if a maximum availability, as measured by the orthophosphate content, is to be obtained in the hydrolyzed product.

EXAMPLE II

Three samples, designated D, E and F, of a single triple superphosphate head sample were subjected to calcination treatments in an air atmosphere for one hour at the temperatures given below in Table 2. Each calcined sample was then subjected to hydrolysis by heating the sample at 356° F. for two hours in a 100% steam atmosphere, with the steam being passed through the tube at the rate of 56 pounds of steam per minute per ton of triple superphosphate. Each hydrolyzed sample was then analyzed for the orthophosphate content. The results of these tests are given below in Table 2.

Table 2

| Sample | Calcining Temperature, ° F. | Percent of Total P₂O₅ as Ortho |
|---|---|---|
| D | 860 | 58 |
| E | 1,040 | 52 |
| F | 1,220 | 14.8 |

This series of tests clearly illustrates that when calcining temperatures above 1200° F. are used the percent of orthophosphate in the product drops off sharply. In order to achieve maximum availability of the product, as measured by the orthophosphate content, the temperature during calcining should, therefore, be below about 1200° F.

EXAMPLE III

Four samples, designated G, H, I and J, of a single triple superphosphate head sample were subjected to calcination at various temperatures as shown below in the table. Sample G was calcined in a muffle furnace while the other samples H, I and J were calcined under fluid bed conditions in a vertical tube furnace. In each case the calcination was in an air atmosphere for one hour. After the calcination treatment samples G, H and I were analyzed for percent fluorine and the P/F ratio was determined. Each calcined sample was then subjected to hydrolysis by heating the sample at 356° F. for one hour in a 100% steam atmosphere. Each hydrolyzed sample was then analyzed for the percent fluorine and the P/F ratio. The results of these tests are given below in Table 3.

Table 3

| Sample | G | H | I | J |
|---|---|---|---|---|
| Calcination Temperature, °F | 914 | 842-932 | 617-662 | 842-932 |
| Calcining Atmosphere | Air | Air | Air | Steam |
| Percent F in Calcined Product | 0.42 | 0.53 | 1.02 | |
| Percent F in Hydrolyzed Product | 0.19 | 0.12 | 0.23 | 0.34 |
| P/F in Calcined Product | 64 | 52 | 26 | |
| P/F in Hydrolyzed Product | 123 | 208 | 106 | 66 |

From the table it may be noted that sample J which was calcined in the presence of steam had a higher fluorine content and a lower P/F ratio than samples G, H and I which were calcined in air.

EXAMPLE IV

A sample of triple superphosphate, having a P/F of 9, was calcined in air at 860° F. for one and one-half hours and then hydrolyzed in a vertical tube furnace. The hydrolyzing was effected by passing steam at the rate of 48 pounds per minute per ton of triple superphosphate through the sample. The hydrolyzing was effected at 356° F. The hydrolyzed product had a P/F of 137.

Another sample of triple superphosphate, having a P/F of 8 was not subjected to any prior calcination but was subjected to hydrolysis in a vertical tube furnace with steam at 419° F. for 2 hours. The steam was used at the rate of 66 pounds of steam per minute per ton of triple superphosphate. The hydrolyzed product had a P/F of 54.

The latter sample, therefore, had a lower P/F even though the hydrolysis treatment of the latter sample was effected for a longer period of time with a greater amount of steam.

This example illustrates that the prior calcination is effective to place the fluorine in condition where it is readily evolved during hydrolysis so as to produce a product having a P/F greater than 100.

The above examples clearly illustrate that when the procedure of the present invention is followed more effective defluorination and a product of much higher P/F ratio is obtained. The high P/F ratio and the high citrate solubility make the product eminently suitable for use as an animal feed ingredient; the product may, however, also be used as plant food.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

I claim:
1. A process for producing a phosphatic material of reduced fluorine content from a solid flourine-containing acid treated phosphatic material having a P/F ratio less than 50/1 which comprises

(a) heating a solid fluorine-containing acid treated phosphatic material selected from the group consisting of superphosphate, triple superphosphate and mixtures thereof, at a temperature within the range of from about 600° F. to about 1200° F. in a gaseous atmosphere containing less than 10 volume percent water for more than 5 minutes, (b) heating at a lower temperature the material resulting from the heating of step (a) to a temperature not in excess of about 446° F., and maintaining the material at a temperature in the range of about 212° F. to about 446° F. in an atmosphere of at least 50% steam for more than five minutes, and (c) recovering a phosphatic material of reduced fluorine content having a P/F ratio greater than 50/1.

2. A process for producing a phosphatic material having a P/F ratio greater than 50/1 from a material having a P/F ratio less than 50/1 which comprises calcining a flourine-containing material selected from the group consisting of superphosphate, triple superphosphate, and mixtures thereof having a P/F ratio less than 50/1 in air containing less than 10 volume percent of steam at a temperature within the range of from about 800° F. to about 1100° F. for at least five minutes, heating at a lower temperature the calcined material to a temperature not in excess of 446° F. and maintaining said material at a temperature within the range of from about 212° F. to about 446° F. in an atmosphere containing at least 75 volume percent of steam for at least five minutes, and recovering a product of reduced fluorine content having a P/F ratio greater than 50/1.

3. The process of claim 1 wherein said fluorine-containing acid treated phosphatic material comprises triple superphosphate.

4. The process of claim 1 wherein said fluorine-containing acid treated phosphatic material comprises superphosphate.

5. The process of claim 1 wherein the heating in steam is effected at a temperature within the range of from about 300° F. to about 446° F.

6. The process of claim 2 wherein said fluorine-containing acid treated phosphatic material comprises triple superphosphate.

7. The process of claim 2 wherein said fluorine-containing acid treated phosphatic material comprises superphosphate.

8. The process of claim 2 wherein the heating in the steam atmosphere is effected at a temperature within the range of from about 300° F. to about 446° F.

9. The process of claim 8 wherein the steamed product is lowered to a temperature below 300° F. in a steam atmosphere before exposing it to the air.

References Cited in the file of this patent
UNITED STATES PATENTS

| | | |
|---|---|---|
| 1,880,491 | Rothe et al. | Oct. 4, 1932 |
| 2,234,511 | Wight et al. | Mar. 11, 1941 |
| 2,933,372 | Manning | Apr. 19, 1960 |
| 2,977,196 | Fleming | Mar. 28, 1961 |
| 2,995,436 | Hollingsworth et al. | Aug. 8, 1961 |
| 2,995,437 | Hollingsworth | Aug. 8, 1961 |